US012736367B2

(12) United States Patent
Brandon

(10) Patent No.: US 12,736,367 B2
(45) Date of Patent: Sep. 15, 2026

(54) VEHICLE SENSORS FOR OBSERVATION OF SURROUNDING FLEET VEHICLES

(71) Applicant: GM Cruise Holdings LLC, San Francisco, CA (US)

(72) Inventor: Jeffrey Brandon, Phoenix, AZ (US)

(73) Assignee: GM Cruise Holdings LLC, San Francisco, CA (US)

( * ) Notice: Subject to any disclaimer, the term of this patent is extended or adjusted under 35 U.S.C. 154(b) by 284 days.

(21) Appl. No.: 18/313,552

(22) Filed: May 8, 2023

(65) Prior Publication Data

US 2024/0377220 A1 Nov. 14, 2024

(51) Int. Cl.
*G01C 21/00* (2006.01)
*B60W 60/00* (2020.01)
*G08G 1/00* (2006.01)

(52) U.S. Cl.
CPC ....... *G01C 21/3841* (2020.08); *B60W 60/001* (2020.02); *G08G 1/202* (2013.01); *B60W 2420/403* (2013.01)

(58) Field of Classification Search
None
See application file for complete search history.

(56) References Cited

U.S. PATENT DOCUMENTS 12,067,878 B1 * 8/2024 Campbell .............. G06Q 40/08
2006/0253570 A1 * 11/2006 Biswas ................. H04W 84/18 709/224
2007/0039030 A1 2/2007 Romanowich et al.
2010/0106420 A1 * 4/2010 Mattikalli ............... G06T 17/05 702/150
2010/0321492 A1 12/2010 Cornett et al.
2014/0225719 A1 * 8/2014 Kesavan ............... B60R 25/102 340/425.5

(Continued)

FOREIGN PATENT DOCUMENTS

WO WO-2017160562 A1 * 9/2017 ............. G06Q 10/02

OTHER PUBLICATIONS

D. Pescaru, C. Istin, D. Curiac and A. Doboli, "Energy Saving Strategy for Video-based Wireless Sensor Networks Under Field Coverage Preservation," 2008 IEEE International Conference on Automation, Quality and Testing, Robotics, Cluj-Napoca, Romania, 2008, pp. 289-294, doi: 10.1109/AQTR.2008.4588754. (Year: 2008).*

*Primary Examiner* — Faris S Almatrahi
*Assistant Examiner* — Selena M Jin
(74) *Attorney, Agent, or Firm* — Honigman LLP; Matthew H. Szalach

(57) ABSTRACT

Systems and methods for automated surveillance of a fleet of vehicles in a parking area using vehicle sensors on various fleet vehicles. In particular, the vehicles in a parking area can be observed and monitored using sensors on a subset of the vehicles. The field of view of each vehicle and overall map coverage of a parking area can be used to determine which vehicles to use for surveillance and/or which sensors on various vehicles to use for surveillance. Thus, surveillance can be optimized using fleet knowledge of vehicle locations within a facility and the scope of coverage of various vehicle sensors to determine where there is overlap in coverage. Appropriate sensors on certain vehicles can be selectively activated to maintain secure coverage without burning resources unnecessarily.

20 Claims, 10 Drawing Sheets

(56) References Cited

U.S. PATENT DOCUMENTS

| | | | | |
|---|---|---|---|---|
| 2015/0356864 | A1* | 12/2015 | Hutchings | G08B 25/009 348/148 |
| 2018/0218582 | A1* | 8/2018 | Hodge | H04N 21/44004 |
| 2019/0026886 | A1* | 1/2019 | Ferguson | G06V 20/588 |
| 2019/0256091 | A1* | 8/2019 | Lepp | G08G 1/143 |
| 2020/0092460 | A1* | 3/2020 | Nadeau | H04N 23/69 |
| 2020/0304726 | A1* | 9/2020 | Karaoguz | G08G 1/164 |
| 2020/0326704 | A1* | 10/2020 | Blanco | G05D 1/0088 |
| 2020/0409361 | A1* | 12/2020 | Herman | G01S 15/931 |
| 2021/0278257 | A1* | 9/2021 | Dharia | G01S 17/89 |
| 2021/0354689 | A1* | 11/2021 | Schreiber | G01S 13/867 |
| 2022/0292970 | A1* | 9/2022 | Dudar | B60W 30/06 |
| 2023/0222898 | A1* | 7/2023 | Salter | G08G 1/127 701/117 |
| 2023/0274647 | A1* | 8/2023 | Nieuwkerk | G08G 1/20 701/23 |
| 2024/0005792 | A1* | 1/2024 | Muehl | G08G 1/096791 |
| 2024/0152199 | A1* | 5/2024 | Lavy | H04N 23/65 |
| 2024/0367676 | A1* | 11/2024 | Xiao | B60W 60/001 |

* cited by examiner 400
402a
402b
402c
402d
402e
402f
402g
402h
402i
402j
406a
406b
406c
406d
410a
410b
410c
410d

VEHICLE SENSORS FOR OBSERVATION OF SURROUNDING FLEET VEHICLES

BACKGROUND

1. Technical Field

The present disclosure generally relates to vehicle sensors and, more specifically, using vehicle sensors to observe surrounding fleet vehicles while parked.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Overview

Systems and methods are provided for automated surveillance of a fleet of vehicles in a parking area using vehicle sensors on various fleet vehicles. In particular, in some examples, the vehicles in a parking area can be observed and monitored using sensors on a subset of the vehicles. The field of view of each vehicle and overall map coverage of a parking area can be used to determine which vehicles to use for surveillance and/or which sensors on various vehicles to use for surveillance. Thus, surveillance can be optimized using fleet knowledge of vehicle locations within a facility and the scope of coverage of various vehicle sensors to determine where there is overlap in coverage. Appropriate sensors on certain vehicles can be selectively activated to maintain secure coverage without burning resources unnecessarily. In some examples, surveillance can be fully automated, while in other examples, the surveillance system can be semi-automated to provide a live feed to centralized security staffing who serve the perception function.

In some cases, security monitoring of vehicles in a parking lot to prevent theft and damage is done by human security staffing. An additional expense in some security systems is the installation of infrastructure-based surveillance cameras integrated into a parking area. In various implementations, fleet vehicle sensors can be used in place of installing external/infrastructure based cameras. Furthermore, to enable parking arrangements with minimal human staffing, the sensors from a select set of strategically located vehicles within a parking area can be used to perform the surveillance functions of a human guard. Additionally, in some implementations, a subset of sensors from the select set of vehicles are activated, while other sensors on the vehicles are deactivated to minimize coverage overlap and save vehicle resources.

Example Vehicle for Automated Fleet Surveillance

Figure 1A:
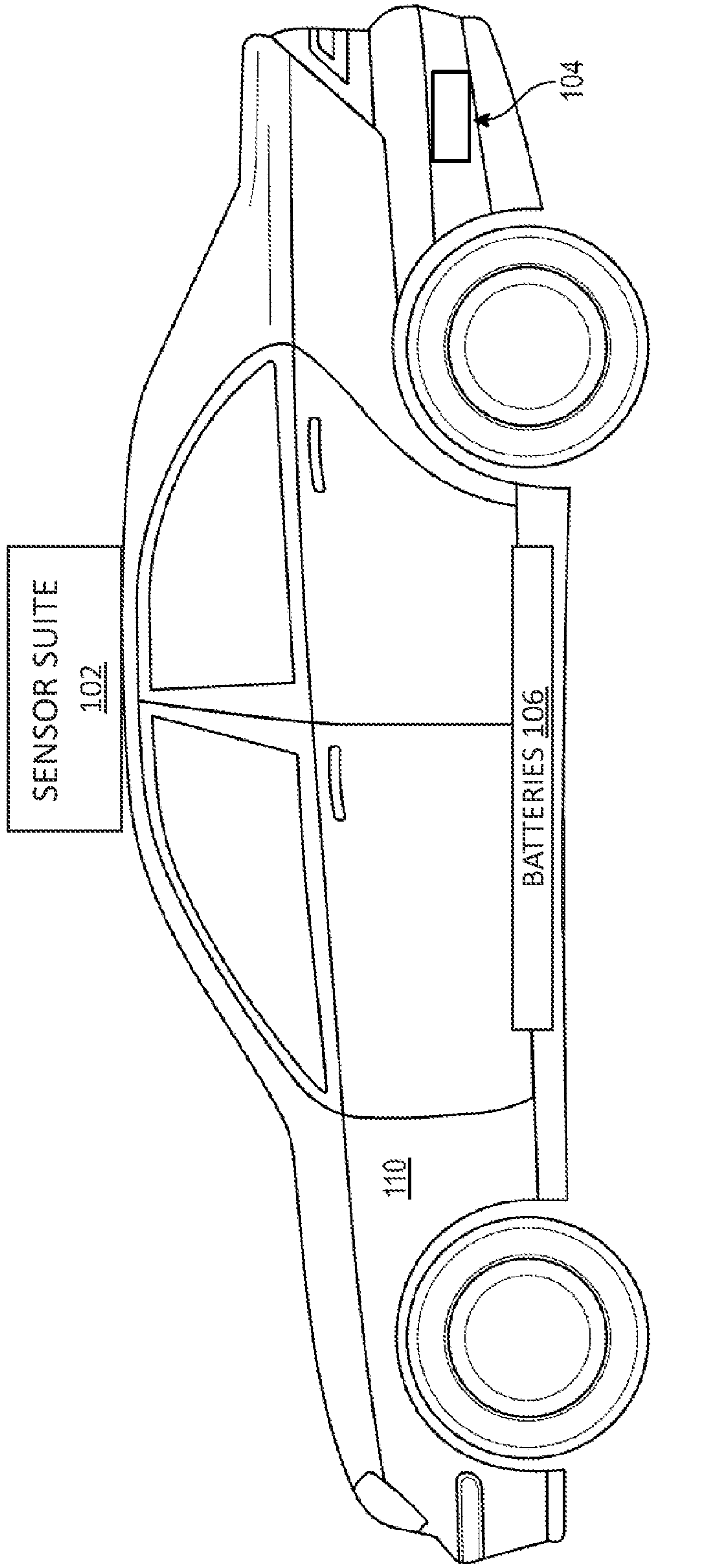
FIGS. 1A-1B illustrate vehicles for automated surveillance, according to some examples of the present disclosure.
Figure 1B:
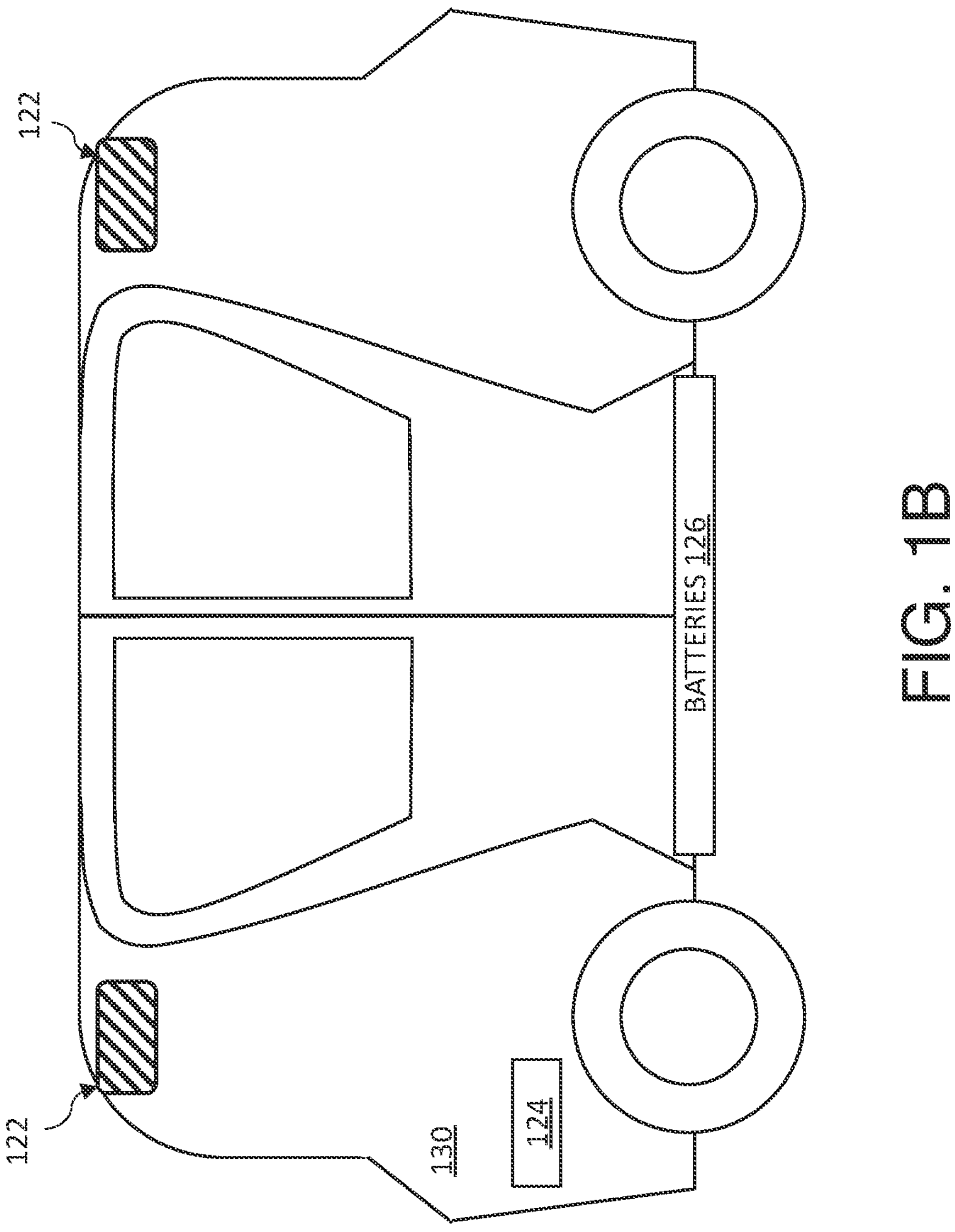

FIGS. 1A-1B illustrate autonomous vehicles 110, 130 for automated fleet surveillance, according to some examples of the present disclosure. The autonomous vehicle 110 includes a sensor suite 102 and an onboard computer 104, and the autonomous vehicle 130 includes sensor suites 122 and an onboard computer 124. In various implementations, the autonomous vehicles 110, 130 uses sensor information from the sensor suites 102, 122 to determine vehicle location, to navigate traffic, to sense and avoid obstacles, and to sense vehicle surroundings. In various examples, the vehicles 110, 130 include additional sensors on the vehicle bodies. According to various implementations, the autonomous vehicles 110, 130 are part of a fleet of vehicles for picking up passengers and/or packages and driving to selected destinations. In some examples, the autonomous vehicles 110, 130 are personal autonomous vehicles that are used by one or more owners for driving to selected destinations. In some examples, the autonomous vehicles 110, 130 can connect with a central computer to download vehicle updates, maps, and other vehicle data. The autonomous vehicles 110, 130 are not always in operation and can spend some amount of time parked in a parking area or charging facility. In various examples, the vehicles 110, 130 are configured to participate in fleet surveillance while parked, including observing other fleet vehicles.

The sensor suites 102, 122 include localization and driving sensors. For example, the sensor suite 102 may include one or more of photodetectors, cameras, RADAR, sound navigation and ranging (SONAR), LIDAR, Global Positioning System (GPS), inertial measurement units (IMUs), accelerometers, microphones, strain gauges, pressure monitors, barometers, thermometers, altimeters, wheel speed sensors, and a computer vision system. The sensor suites 102, 122 continuously monitor the autonomous vehicle's environment. In particular, the sensor suites 102, 122 can be used to identify information and determine various factors regarding an autonomous vehicle's environment. In some examples, data from the sensor suite 102, 122 can be used to update a map with information used to develop layers with waypoints identifying various detected items. Additionally, sensor suite 102, 122 data can provide localized traffic information, ongoing road work information, and current road condition information. Furthermore, sensor suite 102, 122 data can provide current environmental information, including roadside environment or parking area environment information and information about other nearby vehicles when parked, as well as the presence of people, crowds, and/or objects on a roadside, sidewalk, or parking area. In this way, sensor suite 102, 122 data from many autonomous vehicles can continually provide feedback to the mapping system and a high fidelity map can be updated as more and more information is gathered. Additionally, sensor suite 102, 122 data from multiple autonomous vehicles can continually provide feedback to a surveillance system for observation of the surrounding environment, including observation of other fleet vehicles.

In various examples, the sensor suite 102, 122 includes cameras implemented using high-resolution imagers with fixed mounting and field of view. In further examples, the sensor suite 102, 122 includes LIDARs implemented using scanning LIDARs. Scanning LIDARs have a dynamically configurable field of view that provides a point cloud of the region intended to scan. In still further examples, the sensor suite 102, 122 includes RADARs implemented using scanning RADARs with dynamically configurable field of view.

The autonomous vehicles 110, 130 each include an onboard computer 104, 124 which functions to control the autonomous vehicle 110, 130. The onboard computer 104, 124 processes sensed data from the sensor suite 102, 122 and/or other sensors, in order to determine a state of the autonomous vehicle 110, 130. Additionally, the onboard computer 104, 124 processes data for charging, and can use sensor suite 102, 122 data for identifying a charging space in a charging facility. In some examples, the onboard computer 104,124 checks for vehicle updates from a central computer or other secure access point. In some examples, a vehicle sensor log receives and stores processed sensed sensor suite 102, 122 data from the onboard computer 104, 124. In some examples, a vehicle sensor log receives sensor suite 102, 122 data from the sensor suite 102, 122. The vehicle sensor log can be used to determine a state of a vehicle and various maintenance items such as charging, cleaning, and potential vehicle damage. In some implementations described herein, the autonomous vehicles 110, 130 include sensors inside the vehicle. In some examples, the autonomous vehicles 110, 130 include one or more cameras inside the vehicle. The cameras can be used to detect items or people inside the vehicle. In some examples, the autonomous vehicles 110, 130 include one or more weight sensors inside the vehicle, which can be used to detect items or people inside the vehicle. In some examples, the interior sensors can be used to detect passengers inside the vehicle. Additionally, based upon the vehicle state and programmed instructions, the onboard computer 104, 124 controls and/or modifies driving behavior of the autonomous vehicle 110, 130.

The onboard computer 104, 124 functions to control the operations and functionality of the autonomous vehicle 110, 130 and processes sensed data from the sensor suite 102, 122 and/or other sensors in order to determine states of the autonomous vehicle. In some implementations, the onboard computer 104, 124 is a general purpose computer adapted for I/O communication with vehicle control systems and sensor systems. In some implementations, the onboard computer 104, 124 is any suitable computing device. In some implementations, the onboard computer 104, 124 is connected to the Internet via a wireless connection (e.g., via a cellular data connection). In some examples, the onboard computer 104, 124 is coupled to any number of wireless or wired communication systems. In some examples, the onboard computer 104, 124 is coupled to one or more communication systems via a mesh network of devices, such as a mesh network formed by autonomous vehicles.

According to various implementations, the autonomous driving systems 100, 120 of FIGS. 1A, 1B function to enable an autonomous vehicle 110, 130 to modify and/or set a driving behavior in response to parameters set by vehicle passengers (e.g., via a passenger interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110. 130 is preferably a fully autonomous automobile, but may additionally or alternatively be any semi-autonomous or fully autonomous vehicle. In various examples, the autonomous vehicle 110, 130 is a boat, an unmanned aerial vehicle, a driverless car, a golf cart, a truck, a van, a recreational vehicle, a train, a tram, a three-wheeled vehicle, a bicycle, a scooter, a tractor, a lawn mower, a commercial vehicle, an airport vehicle, or a utility vehicle. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110, 130 includes a throttle interface that controls an engine throttle, motor speed (e.g., rotational speed of electric motor), or any other movement-enabling mechanism. In various implementations, the autonomous vehicle 110, 130 includes a brake interface that controls brakes of the autonomous vehicle 110, 130 and controls any other movement-retarding mechanism of the autonomous vehicle 110, 130. In various implementations, the autonomous vehicle 110, 130 includes a steering interface that controls steering of the autonomous vehicle 110, 130. In one example, the steering interface changes the angle of wheels of the autonomous vehicle. The autonomous vehicle 110, 130 may additionally or alternatively include interfaces for control of any other vehicle functions, for example, windshield wipers, headlights, turn indicators, air conditioning, etc.

Method for Automated Surveillance

Figure 2A:
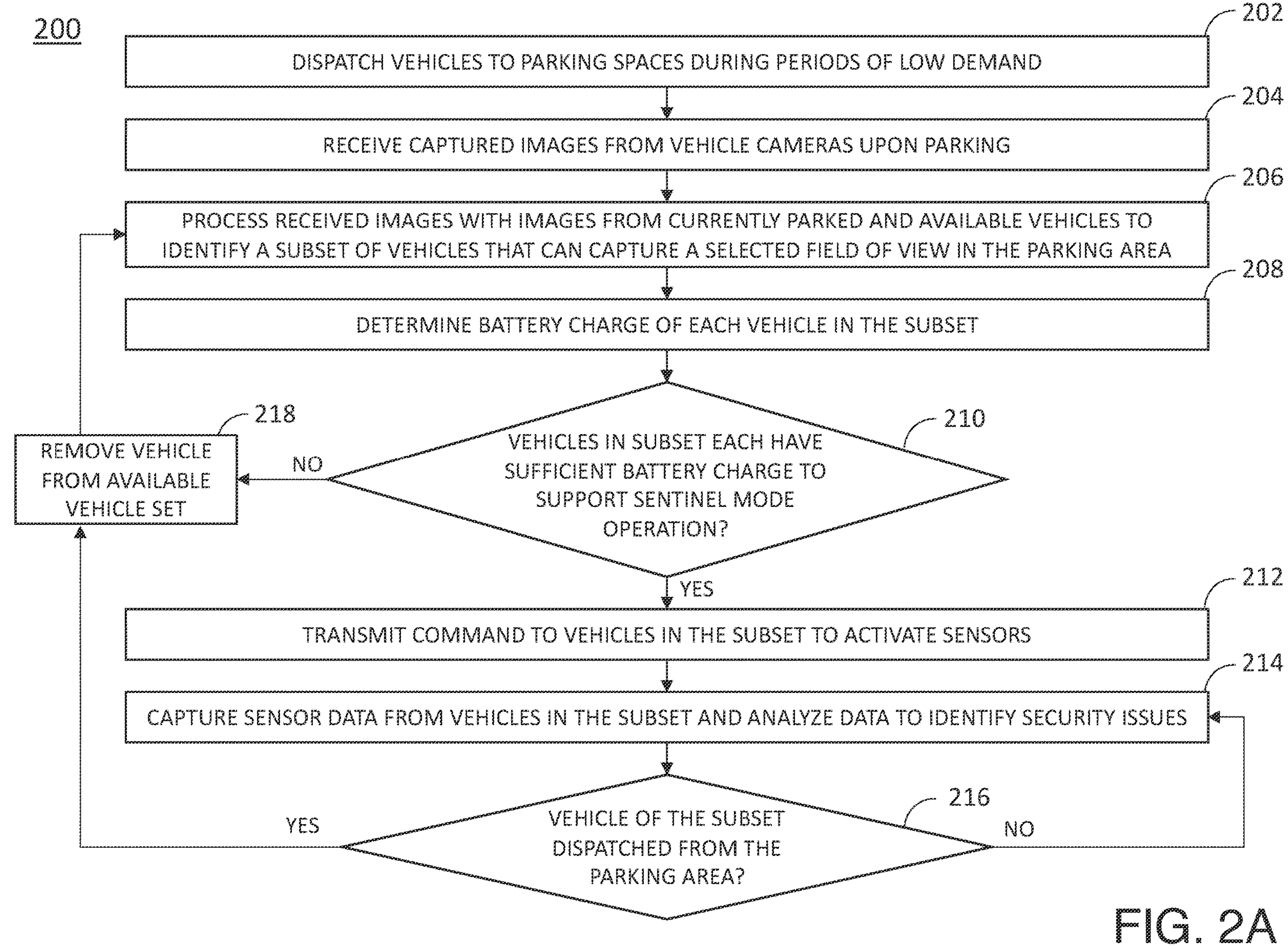
FIGS. 2A-2C are flow charts illustrating methods for automated surveillance of fleet vehicles, according to some examples of the present disclosure.

FIG. 2A is a flow chart illustrating a method 200 for automated surveillance of fleet vehicles, according to various examples of the present disclosure. In some examples, the method 200 can be used for surveillance of multiple fleet vehicles parked in a parking area. At step 202, when demand is low for rides and/or deliveries in fleet vehicles, a set of fleet vehicles are due for maintenance, or a set of vehicles need to be removed from the road to comply with government rules or regulations, multiple vehicles can be dispatched to parking areas to wait out the period of low demand. Additionally, electric vehicles can be dispatched to parking areas that include chargers for recharging vehicle batteries. When a vehicle arrives at a parking area, the vehicle captures images of its surroundings. In particular, when a vehicle is parked in a parking space, the vehicle captures sensor data of its surroundings. In some examples, the sensor data can include images, LIDAR data, and/or RADAR data. The vehicle transmits and/or uploads the captured sensor data to a central computer, such as to a cloud system and/or to an on-premises data collection system. At step 204, the central computer receives the captured sensor data from the vehicle.

According to various implementations, the central computer includes a database of other sensor data, including images. In particular, the central computer has a database of sensor data including images from fleet vehicles that are currently parked in the parking area and available to participate in surveillance. The database of sensor data is also referred to as a library of fields of view. Whether a vehicle is available to participate in surveillance can depend on various factors such as vehicle high voltage battery state of charge (e.g., a state of charge above a threshold may indicate that the vehicle is available to assist with surveillance), vehicle sensor conditions (e.g., whether sensors are obstructed), and other vehicle conditions. At step 206, the central computer processes the new captured sensor data received from the newly parked vehicle with existing sensor data from the database of sensor data from currently parked and available vehicles, and using the sensor data, the central computer identifies a subset of vehicles that can capture a selected field of view in the parking area. In some examples, the field of view can vary depending on the type of sensor data, and the central computer can, for example, identify a subset of vehicles that can capture a selected image data field of view for image data, a selected LIDAR data field of view, and/or a selected RADAR data field of view. Additionally, the central computer can identify a subset of vehicles that can capture a selected field of view for other sensor data. In some examples, the central computer processes the sensor data and identifies a subset of available vehicles that provide the desired coverage. In various examples, the central computer determines the minimum number of available vehicles in the parking area that can provide the desired coverage. In some examples, the central computer can stitch together the sensor data from the identified subset of vehicles. In one example, the central computer can stitch together the sensor data based on a collection of additional sensor data. The stitched together sensor data can determine the total field of view of the parking area. In various examples, the selected field of view can be limited to save energy, since surveillance can be a high energy activity.

In some implementations, certain areas of the parking area are high priority areas for surveillance while other areas are low priority areas for surveillance. For example, a highly trafficked area such as an open gate or thruway where people and/or vehicles can enter and/or exit the parking area can be a high priority area for surveillance. In contrast, a part of a parking area where a vehicle is parked next to a wall can be a low priority area. Similarly, a perimeter space that is open may be considered less secure than a walled-in or fenced-in perimeter space and can be a higher priority than a walled-in or fenced-in perimeter space. Additionally, knowledge about the area surrounding the parking area can be considered in prioritizing areas for surveillance. In general, a low priority area can be a portion of the parking area where it is unlikely that a person and/or other vehicle will come in close proximity with a parked vehicle. A high priority area can be a portion of the parking area where it is likely that a person and/or other vehicle will come in close proximity with a parked vehicle. Additionally, a high priority area can be a portion of the parking area where it is likely that a person and/or other vehicle will be moving within the parking area. In some examples, referring to step 206 of the method 200, the selected field of view in the parking area includes multiple views of high priority areas and limited views of low priority areas. In some examples, the total possible field of view given the available vehicles is smaller than the total field of view of the parking area, and available vehicles are positioned in parking spaces that provide a field of view of the high priority areas.

Additionally, in some implementations, the general security risk based on where the parking area is located can be considered. For instance, a parking area located in a city can be considered a higher risk parking area than a parking area located outside the city. The parking area located inside the city can prioritize more comprehensive surveillance and a greater selected field of view, while the parking area located outside the city may have a limited selected field of view, focusing surveillance just on the parking area entrances and exits. In some examples, when a selected area and/or parking area is a high priority area, the set of vehicles participating in surveillance (i.e., the set of vehicles in sentinel mode) can be increased to increase the number of field of views and increase overall coverage. Similarly, in some examples, when a selected area and/or parking area is a high priority area, the number of vehicle sensors activated for surveillance can be increased to increase the number of field of views and increase overall coverage.

In some implementations, vehicles other than fleet vehicles can be included in the surveillance activities. In particular, any vehicle including image capturing sensors that is parked in the parking area can provide images to the surveillance system. In some implementations, multiple vehicle sensors are used for a vehicle-based surveillance system, including accelerometers, IMUs, cameras, LIDAR sensors, and RADAR sensors.

At step 208, the state of charge of each vehicle in the identified subset is determined. In some examples, the central computer requests the state of charge from each vehicle in the subset, and each vehicle in the subset transmits its current state of charge to the central computer. In other examples, each vehicle regularly transmits (e.g., hourly transmits) its state of charge to a fleet management service, and the central computer accesses the most recent state of charge data for each vehicle. The state of charge data can include the high voltage battery state of charge as well as other charge data, such as low voltage battery state of charge. In some examples, for non-electric vehicles, the state of charge data can include other available energy resource data such as fuel level. The state of charge data can include predicted states of charge at various points of time in the future.

At step 210, it is determined whether each of the vehicles in the subset has sufficient battery charge to support sentinel mode operation, where sentinel mode operation includes keeping vehicle sensors active to observe and/or surveil the surrounding area, and communicating captured data with the central computer. In some examples, the central computer determines whether a vehicle in the subset has sufficient battery charge to support sentinel mode operations. In some examples, the vehicle itself determines it does not have sufficient battery charge to support sentinel mode operation. In general, sentinel mode includes surveillance activities that utilize energy, so the system is designed to ensure that vehicles participating in surveillance activities have sufficient charge to perform the surveillance activities and the vehicle batteries do not become depleted. Additionally, anticipated and/or predicted charge level can be determined, such that if a vehicle is being charged and is expected to have sufficient charge to perform the surveillance activities, the vehicle can be included in the available vehicle set used at step 206. For any vehicle that does not have sufficient battery charge to support sentinel mode, the method proceeds to step 216 and that vehicle is removed from the available vehicle set used at step 206 to identify the subset of vehicles (and that vehicle's sensor data is removed from the sensor data set/the library of fields of view). After the insufficiently charged vehicle is removed from the available vehicle set (and its sensor data is removed from the sensor data set), the method 200 returns to step 206 and identifies a new subset of vehicles that can, together, capture the desired field of view in the parking area.

If, at step 210, each of the vehicles in the subset has sufficient charge to support sentinel mode operation, the method 200 proceeds to step 212, and the central computer transmits a message to each of the vehicles in the subset to activate vehicle sensors and enter sentinel mode. In various implementations, in sentinel mode, all the sensors on each vehicle in the subset are activated. In some implementations, as described in greater detail with respect to FIG. 2B, a subset of sensors on various vehicles of the subset of vehicles are activated.

At step 214, the vehicles in the subset capture sensor data. The sensor data is analyzed to determine if there are any security issues and identify any security threats. In some examples, the sensor data is transmitted to a central computer for analysis. In particular, a central computer can receive the captured sensor data from the vehicles in the subset, and, using the combined sensor data, identify security issues and/or threats. In some examples, one or more vehicles in the subset analyze the captured sensor data to identify security issues. In particular, each vehicle can analyze the sensor data captured by the vehicle, identify any potential in some examples, security issues, and transmit captured sensor data relating to an identified potential security issue to a central computer. Additionally, in some examples, one or more vehicles can transmit captured sensor data to a selected vehicle, and the selected vehicle can analyze the combined captured sensor data and identify potential security issues and/or threats. In some examples, the selected vehicle can transmit captured sensor data relating to an identified potential security issue to a central computer.

At step 216 it is determined whether a vehicle of the subset of vehicles is dispatched from the parking lot. In some examples, the central computer determines that a vehicle is dispatched from the parking lot, and in some examples, a dispatched vehicle from the subset of vehicles transmits a message to the central computer system when it is dispatched. In some examples, the method 200 can repeat step 216 periodically so long as no vehicle is dispatched from the parking area. In some examples, the method 200 repeats step 216 until a new vehicle enters the parking lot, and then the method 200 returns to step 202. In some examples, the method 200 repeats step 216 periodically (e.g., every minute, every five minutes, or every ten minutes) and also returns to step 210 to review the state of charge of vehicles in the subset periodically (e.g., every hour, or every few hours). At step 216, if it is determined that a vehicle of the subset of vehicles is dispatched from the parking area, the method 200 returns to step 218 and the dispatched vehicle is removed from the subset of vehicles and from the available vehicle set, and the dispatched vehicles sensor data is removed from the sensor data database/sensor data library.

In various implementations, a central computer implements the method 200 and determines the minimum number of vehicles that can provide a selected field of view of surveillance for the parking area. In some examples, the minimum number of vehicles can be affected by various characteristics of the parking area, such as the presence of obstructions, the presence of charging stations, the presence of non-fleet vehicles in the parking area, the location of pedestrian entrances, pedestrian exits, staircases, elevators, vehicle entrances, vehicle exits, and other features. In general, the characteristics of the parking area are reflected on a high definition map, which the central computer can use to identify optimal parking spaces for surveillance. In some examples, the central computer system can dynamically adjust vehicle surveillance activities to address stochastic situations, such as parking areas that include non-fleet vehicles and privately-owned vehicles.

In various implementations, the method 200 employs a passive system in that vehicles already parked in the parking area can provide a surveillance service and no other systems or people are needed. In general, the already-existing fleet of vehicles can be re-used for surveillance with minimal impact to the fleet.

Figure 2B:
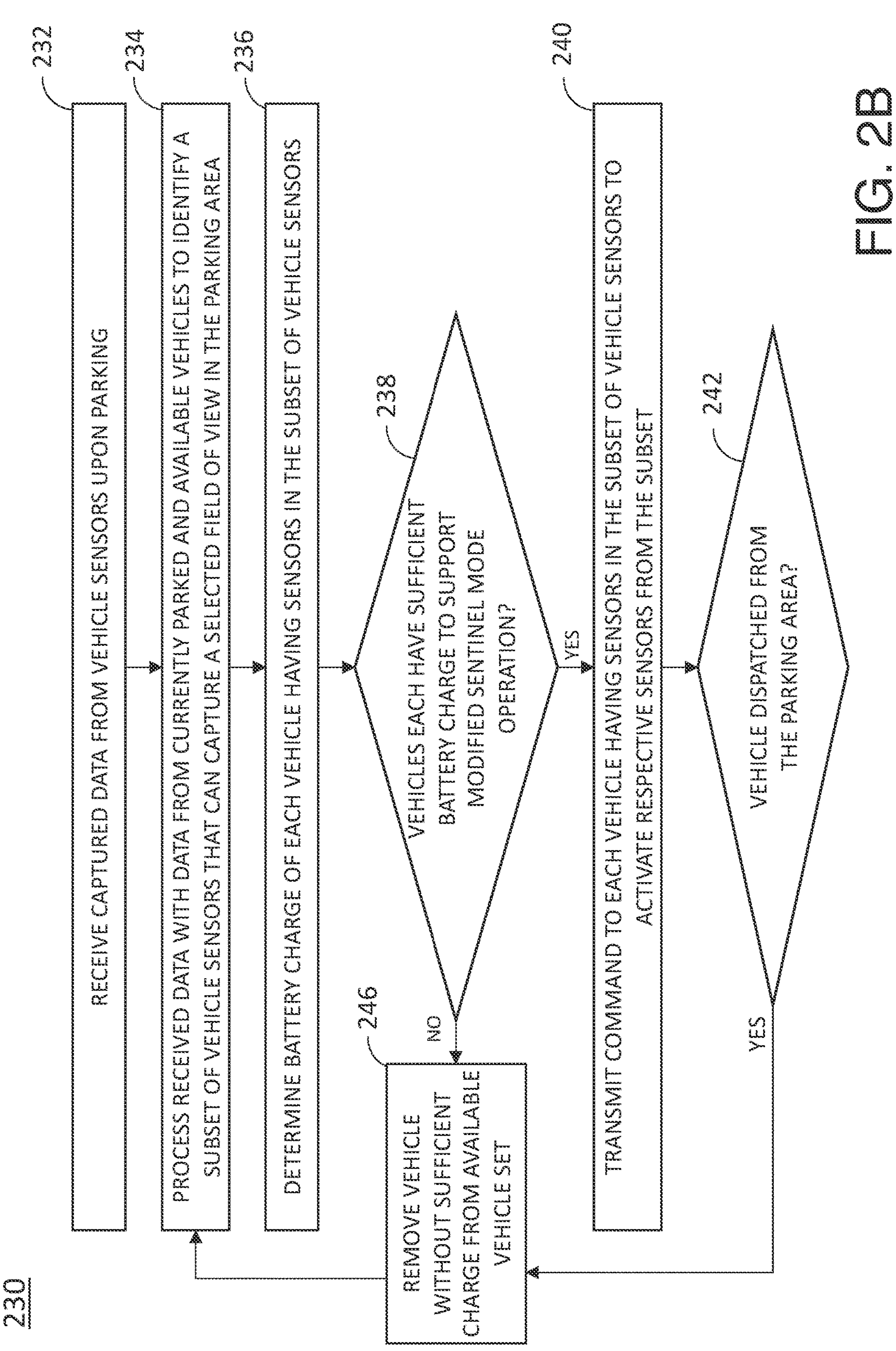

FIG. 2B is a flow chart illustrating a method 230 for automated surveillance of fleet vehicles in which a subset of sensors on any particular vehicle is activated, according to various examples of the present disclosure. At step 232, a first vehicle parks in a parking area, and data captured by vehicle sensors is received. The data can be received, for example, at a central computer. In some examples, the data is image data captured by image sensors, and in some examples the data includes LIDAR data and/or RADAR data. At step 234, the received data is processed along with data from other currently parked and available vehicles to identify a subset of vehicle sensors that can capture a selected field of view in the parking area. In particular, the subset of vehicle sensors can include a subset of sensors on the first vehicle, as well as a subset of the sensors on other currently parked and available vehicles. Once the subset of vehicle sensors is identified, the corresponding vehicles on which each of the subset of vehicle sensors is located is identified. At step 236, the state of charge of each of the corresponding vehicles (each vehicle having sensors in the subset of vehicle sensors) is determined.

At step 238, it is determined whether each of the corresponding vehicles has sufficient state of charge to support a modified sentinel operation. A modified sentinel operation is a sentinel operation including only a subset of the vehicle's sensors. Thus, in some examples, in a modified sentinel operation mode, a vehicle monitors a portion of its total field of view. The amount of charge used in the modified sentinel mode can depend on the number of a vehicle's sensors that remain active in the modified sentinel mode. Similarly, the amount of charge used in the modified sentinel operation mode can depend on the number of a vehicle's sensors that are deactivated in the modified sentinel mode. Additionally, anticipated and/or predicted charge level can be determined, such that if a vehicle is being charged and is expected to have sufficient charge to perform the surveillance activities, the vehicle can be included in the available vehicle set used at step 234. If a vehicle of the corresponding vehicles does not have sufficient charge to support the modified sentinel operation assigned to the vehicle, the method 230 proceeds to step 246, the vehicle is removed from the available vehicle set, and the method 230 then returns to step 234.

If, at step 238, the corresponding vehicles each have sufficient charge to support the modified sentinel operation assigned to each respective vehicle, the method 230 proceeds to step 240, and a message is transmitted to each of the vehicles having sensors in the subset of vehicle sensors to activate the respective sensors from the subset of vehicle sensors and enter the modified sentinel operation mode including observing the sensor fields of view captured by the respective sensors. At step 242, it is determined whether a vehicle having sensors in the subset of vehicle sensors departs from the parking area. In some examples, the method 230 can repeat step 242 periodically until a vehicle is dispatched from the parking area. In some examples, the method 230 repeats step 242 until a new vehicle enters the parking lot, and then the method 230 returns to step 232. In some examples, the method 230 repeats step 242 periodically (e.g., every minute, every five minutes, or every ten minutes). The method 230 can also return to step 238 to review the state of charge of vehicles in the subset periodically (e.g., every hour, or every few hours). At step 242, if it is determined that a vehicle of the subset of vehicles departs the parking area, the method 230 returns to step 246 and the departed vehicle is removed from the set of available vehicles. Additionally, the departed vehicle's data is removed from the vehicle data database/data library.

Figure 2C:
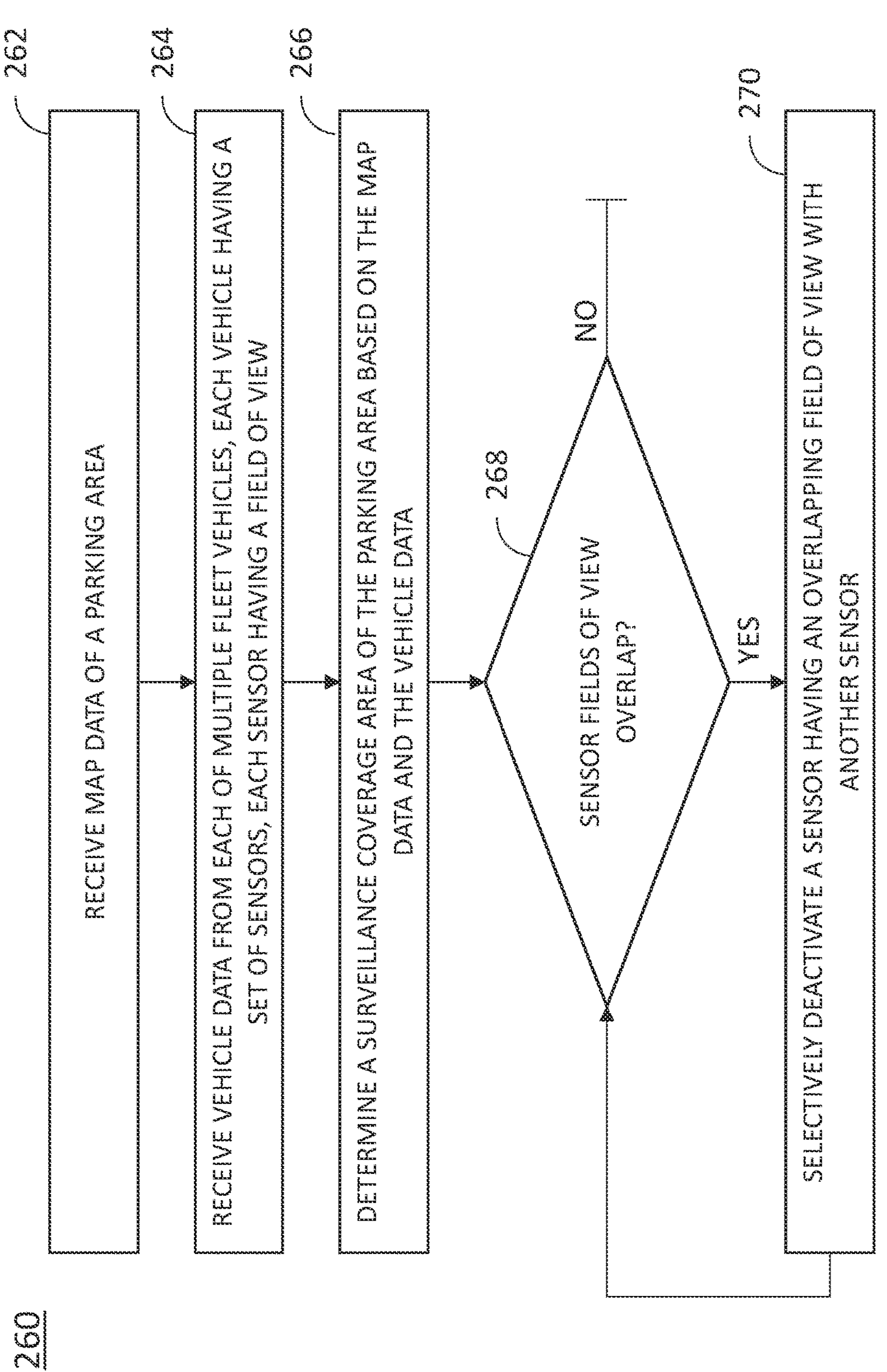

FIG. 2C is a flowchart illustrating another method 260 for automated surveillance of fleet vehicles in which a subset of sensors on any particular vehicle is deactivated, according to various examples of the present disclosure. At step 262, map data for a parking area is received. The map data can include high definition map data. The map data can be received by a central computer. At step 264, vehicle data is received from multiple fleet vehicles, each fleet vehicle having a set of sensors, and each sensor of the sets of sensors having a field of view. At step 266, an available surveillance coverage area of the parking area is determined based on the map data and the vehicle data. In some examples, a preferred surveillance coverage area of the parking area is identified. When the preferred surveillance coverage area of the parking area is encompassed by the available surveillance coverage area, sensors having a field of view outside the preferred surveillance coverage area can be deactivated.

At step 268, it is determined whether the fields of view of individual sensors of each of the sets of sensors overlap. In some examples, at step 268, it is determined whether sensors having fields of view in the preferred surveillance coverage area overlap. If there is no overlap in sensor fields of view at step 268, the method 260 ends. If there is overlap in the sensor fields of view at step 268, a sensor having an overlapping field of view with another sensor is deactivated. In some examples, when two sensors have overlapping fields of view, selecting the sensor for deactivation can be based on the non-overlapping portion of the fields of view. In some examples, when two sensors have overlapping fields of view, selecting the sensor for deactivation can be based on the state of charge of the vehicles on which the sensors are included (e.g., the sensor on the vehicle with the lower state of charge is deactivated).

Figure 3:
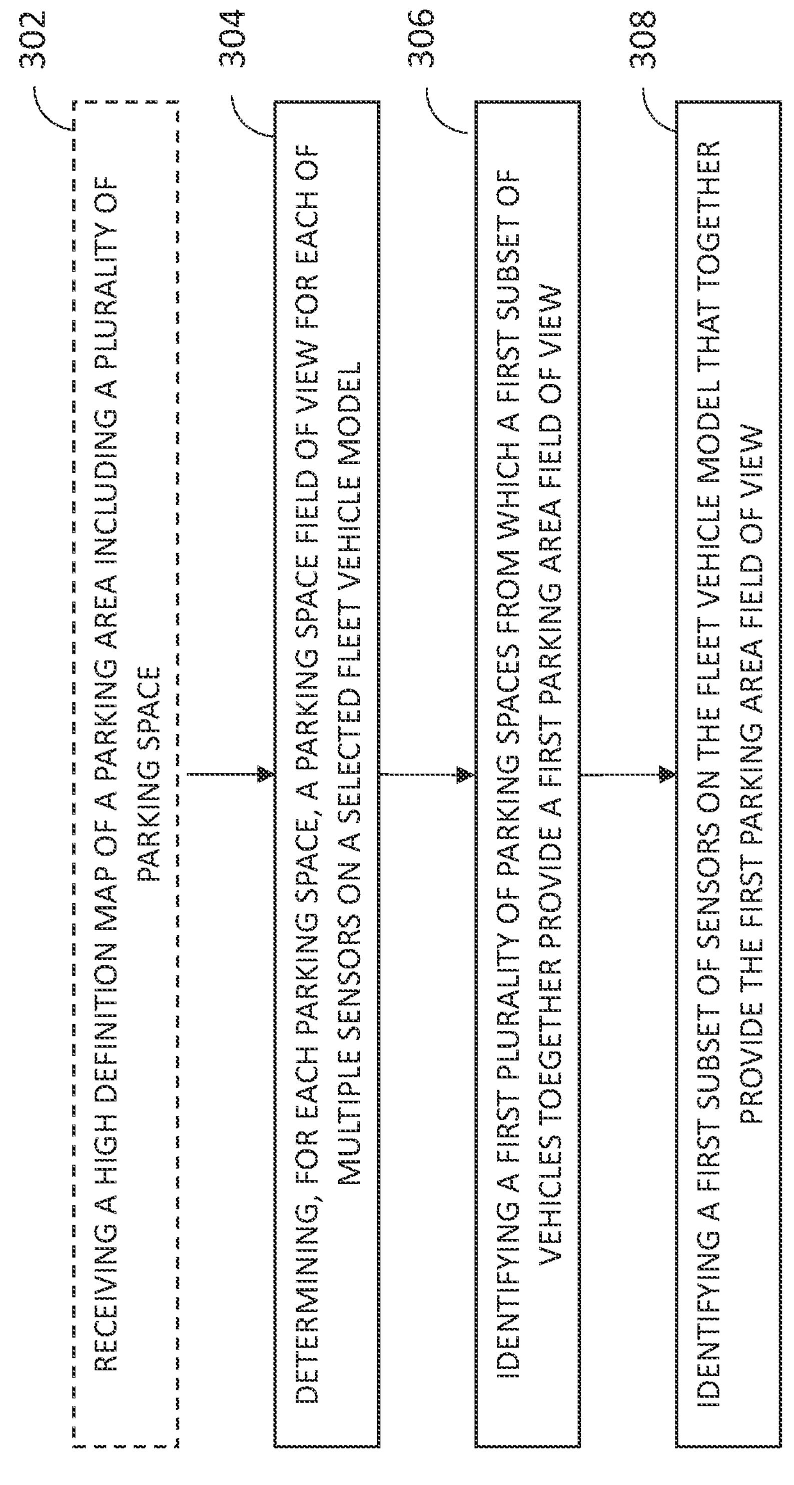
FIG. 3 illustrates a flow chart of a method for automated surveillance, according to some examples of the present disclosure.

FIG. 3 is a flowchart illustrating another method 300 for automated surveillance of fleet vehicles, according to various examples of the present disclosure. In various examples, the method 300 of FIG. 3 can be used to identify ideal parking spaces in a parking area for vehicles to operate in sentinel mode and provide parking area surveillance. In some examples, certain parking spaces can be pre-identified as parking spaces for vehicles to operate in sentinel mode and certain parking spaces can be pre-identified as parking spaces for vehicles to operate in partial sentinel mode (with a subset of sensor activated and a subset of sensors deactivated).

At step 302, a high definition map of a parking area including a plurality of parking spaces is received. In some examples, a central computer can store the high definition map of the parking area, and in some examples, the high definition map can be updated based on data received at the central computer from vehicle sensors. At step 304, for each parking space in the parking area, and for each of multiple sensors on a selected vehicle model, a parking space field of view is determined. In some examples, the parking space field of view can be determined using the high definition map and vehicle model data. That is, in some examples, it is not necessary for a vehicle to capture the field of view data, and the central computer can infer the parking space field of view data based on existing vehicle field of view data and map data. In some examples, vehicles can be repositioned in a parking area to provide improved surveillance coverage.

At step 306, based on the parking space field of view determinations, multiple parking spaces are identified, where the parking spaces include parking spaces from which a first subset of vehicles together provide a first parking area field of view. Respective vehicles of the first subset of vehicles are the selected vehicle model. The first parking area field of view can be a preferred parking area field of view. A different vehicle model can have different sensor fields of view. At step 308, for each of the multiple parking spaces, a first subset of sensors on the selected vehicle model is identified, where the first subset of sensors together provides the first parking area field of view. Note that for a different vehicle model, a different subset of sensors can together provide the first parking area field of view.

In some examples, the geometry and pose of a vehicle can be used to determine its field of view. In one example, if the azimuth direction of the vehicle is known and the field of the vehicle sensors is known, the vehicle field of view can be created virtually using HD maps of the area. In some examples, the vehicle azimuth and IMU location data is used to virtually construct the vehicle field of view using HD maps of the area. In some examples, overlapping camera images can be stitched together to create the vehicle camera field of view. Similarly, overlapping LIDAR data an be stitched together to create the vehicle LIDAR sensor field of view, and overlapping RADAR data an be stitched together to create the vehicle RADAR sensor field of view. In various examples, overlapping sensor data for any type of vehicle sensor can be stitched together to create the vehicle field of view for the particular sensor.

In some examples, in any of the systems and methods provided herein, one or more vehicle sensors can be occluded. For instance, rain or snow can cover a sensor. If a sensor is occluded, it is removed from the plurality of sensors used to provide a parking space field of view. In various examples, in an outdoor parking area, the availability of various sensors can change over time as a vehicle and/or vehicle sensor can be covered in snow, or become dirty. In particular, sitting vehicles are subject to sensor occlusion. In some instances, a vehicle can include an automated cleaning system that can clear a sensor occlusion. In other examples, a sensor can be damaged and/or occluded by vandalism. In general, if a sensor becomes occluded, it is removed from the list of available sensors, and the systems and methods described above can return to a step of looking for a sensor from another vehicle that provides a similar field of view.

In various examples, in any of the systems and methods for parking area surveillance, additional information can be received from other vehicles in the vicinity. For example, vehicles driving past the facility can provide data captured from outside the facility. In particular, external sensors of passing vehicles can provide sensor data for the parking area. Since passing vehicles are driving, sensor data of the areas around the vehicle are being captured as part of the full operation driving mode. For examples, external image sensors of passing vehicles can provide images of the parking area. Images of the areas around the vehicle are being captured as part of the full operation driving mode. Vehicles include a perception stack that can be used for object identification as well as for occlusion detection. For example, vehicles in driving mode perform object classification and can determine what objects are captured in the sensor data, and can identify objects such as people, animals, bicycles, strollers, skateboards, and scooters. In another example, occlusion detection includes determining where vehicle blind spots are. In some examples, vehicles can be intentionally routed past a parking area to capture and process sensor data of the outside of the parking area.

In various implementations, autonomous vehicles can enter a sentinel mode. While in a very low power state, where the sentinel mode is a self-security mode. In sentinel mode, autonomous vehicles can classify detected events as significant events and non-significant events. In some examples, in sentinel mode, multiple accelerometers in the body of the vehicle can be used to detect events. The accelerometers are also used for low speed collision detection. For example, the magnitude and/or amplitude of acceleration can be used for event classification. In some examples, any detected event is logged, along with the event classification. For significant events, a message can be transmitted to a central computer or response team communicating the significant event. In some examples, other info collected about the significant event can also be communicated to the central computer or response team. Additionally, when a significant event is detected, sensor feeds from the interior and exterior of the vehicle can be saved starting before a selected period before the significant and ending when an instruction or message is received to stop spooling the sensor feeds. In one example, the 30 seconds before the event and 30 seconds after an event can be saved for review. In some examples, when a significant event is detected, a response team reviews camera footage and determines whether the significant event is a false positive or not. For some events, a human can be deployed to look at the vehicle and determine what happened to the vehicle or on the vehicle, and determine whether the vehicle can drive to a facility for repair or if a tow truck is requested to transport the vehicle. In some examples, a significant event can be an impact from a person, an object, or another vehicle. In one example, a significant event is a scratch or a dent, for which a vehicle can be instructed to drive itself to a repair facility.

In some examples, a vehicle in sentinel mode can be in a low power state and motion detection causes the vehicle to power on to a full power state. In some examples, for fleet vehicles in a parking area, if one of the vehicles detects motion, the other fleet vehicles that are in the parking area can switch to sentinel mode to observe the motion. In some examples, for fleet vehicles in a parking area, if one of the vehicles detects motion, other fleet vehicles having a field of view including the area of the motion can switch to sentinel mode. Similarly, in some examples, if one of the vehicles detect an event, other vehicles that have a vehicle field of view that includes the event can switch to sentinel mode and observe the area of the event. In some examples, an event detected in sentinel mode is communicated with a central computer or other fleet manager, and the central computer notifies vehicles within a selected proximity and instructs a switch to sentinel mode for the vehicles within the selected proximity. In some examples, a sentinel mode event is detected because of damage to the vehicle, and due the damage, it is determined it is best not to autonomously move the vehicle. In some examples, when a sentinel mode event is detected, other vehicles within a selected proximity of the vehicle that detected the sentinel mode event drive away from the area of the event. In some examples, when a sentinel mode event is a potential vandalism event, one or more fleet vehicles in the vicinity can block a parking area entrance.

Example Parking Area Having Autonomous Surveillance

Figure 4:
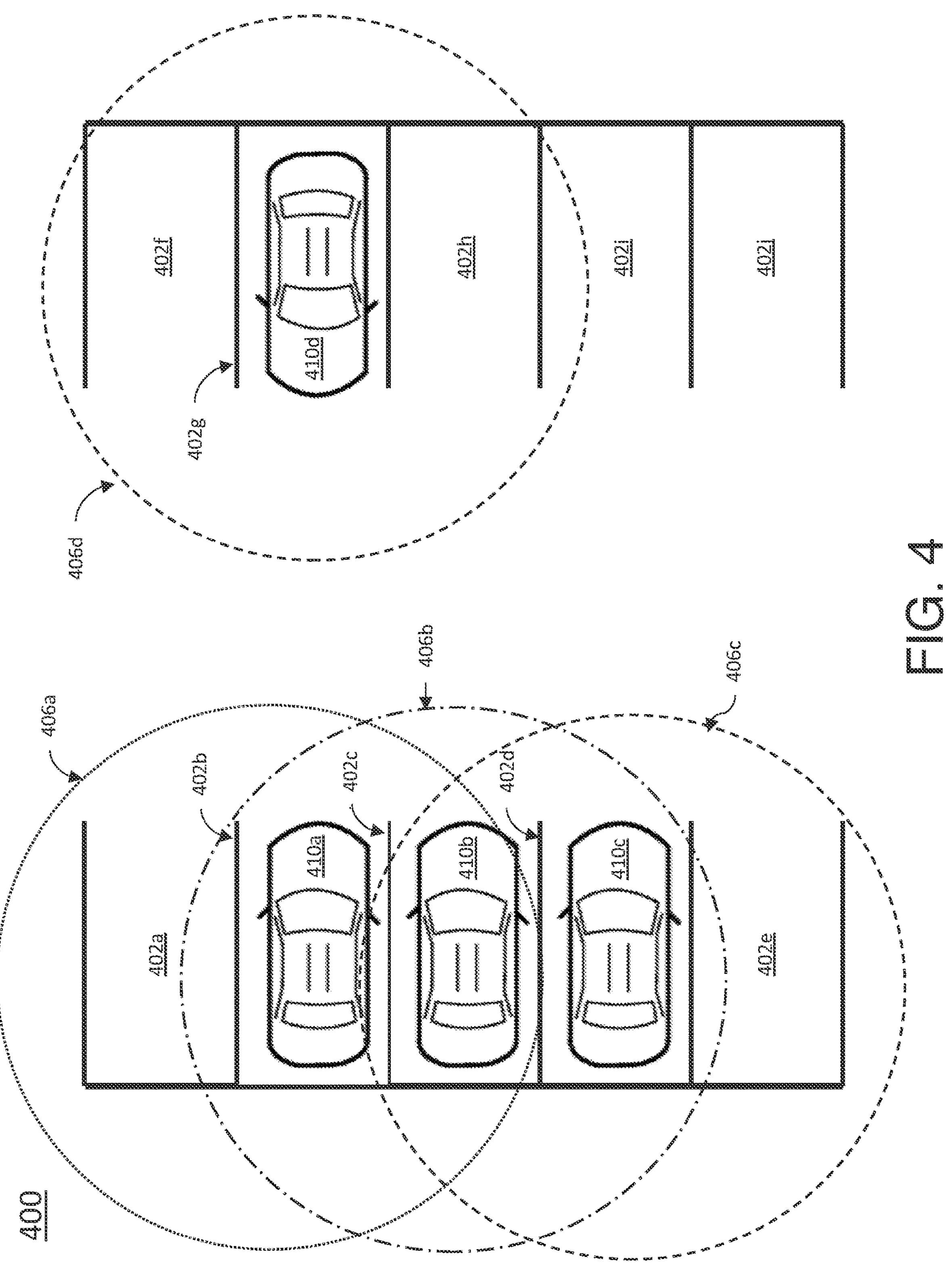
FIG. 4 illustrates a parking area having ten parking spaces, according to some examples of the disclosure.

FIG. 4 illustrates a parking area 400 having ten parking spaces 402*a*-402*j*, according to some examples of the disclosure. As shown in FIG. 4, there are four vehicles 410*a*, 410*b*, 410*c*, 410*d* parked in parking spaces 402*b*, 402*c*, 402*d*, 402*g*, respectively, of the parking area 400. Each of the vehicles 410*a*, 410*b*, 410*c*, 410*d* has a parking space field of view 406*a*, 406*b*, 406*c*, 406*d*. Although the fields of view 406*a*-406*d* are shown as circular fields of view in FIG. 4, the fields of view 406*a*-406*d* may be any shape. Additionally, the fields of view 406*a*-406*d* can extend outward until ending at an obstruction, such as a parking area wall or distant building, and do not end at the edge of the circles 406*a*-406*d*, which are illustrative only. In further examples, the fields of view 406*a*-406*d* may not be uniform, and the fields of view 406*a*-406*d* can be composed of overlapping cones of fields of view from individual sensors. In some examples, a single vehicle camera has a field of view that is less than 360 degrees, and multiple cameras with overlapping fields of view are used to generate a 360 degree field of view 406*a*-406*d* for each vehicle 410*a*-410*d*.

As shown in FIG. 4, most of the field of view 406*b* of the second vehicle 410*b* overlaps with the fields of view 406*a*, 406*c* of the first 410*a* and third vehicles 410*c*. Thus, in one example, the second vehicle 410*b* can be in a sleep mode while the first 410*a* and 410*c* are in a sentinel mode and provide surveillance of the second vehicle 410*b*. In another example, one or more sensors on the second vehicle 410*b* can be active in a sentinel mode state, while the remaining sensors are in a sleep mode.

Example of an Autonomous Vehicle Fleet System for Autonomous Surveillance

Figure 5:
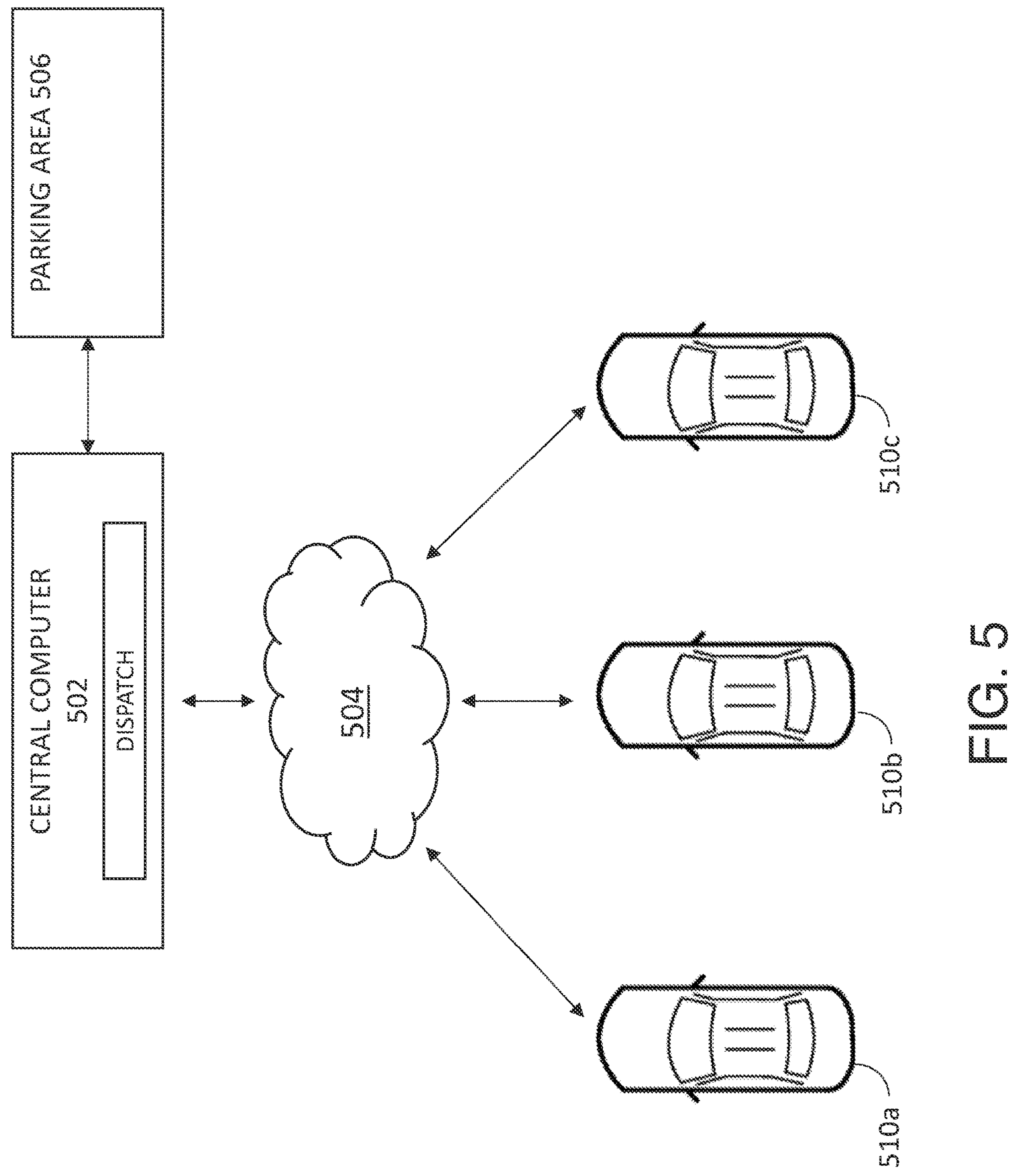
FIG. 5 is a diagram illustrating a fleet of autonomous vehicles in communication with a central computer, according to some embodiments of the disclosure.

FIG. 5 is a diagram 500 illustrating a fleet of autonomous vehicles 510*a*, 510*b*, 510*c* in communication with a central computer 502, according to some embodiments of the disclosure. The vehicles 510*a*-510*c* communicate wirelessly with a cloud 504 and a central computer 502. The central computer 502 includes a routing coordinator, a dispatch service, and a database of information from the vehicles 510*a*-510*c* in the fleet. In some examples, the database of information can include a state of cleanliness of each vehicle as well as other vehicle conditions and information. Autonomous vehicle fleet routing refers to the routing of multiple vehicles in a fleet. The central computer 502 also communicates with various parking areas such as the parking area 506. In some examples, the dispatch system at the central computer 502 can communicate a parking instruction to any of the vehicles 510*a*-510*c*, such as when demand for vehicle services is low. The dispatch system can then route the vehicle 510*a*-510*c* to a parking area 506. Additionally, the dispatch system can provide the parking area 506 with the time at which the vehicle 510*a*-510*c* will arrive at the parking area 506, and the parking area 506 can identify a parking spot for the vehicle 510*a*-510*c*. In some examples, the parking area 506 can communicate the identified parking spot with the dispatch system and/or with the vehicle 510*a*-510*c*. In some examples, the parking spot can be determined based on a surveillance need, such that a vehicle 510*a*-510*c* is directed to a parking spot from which it can provide surveillance of the parking area 506. In various examples, once parked, one or more of the vehicles 510*a*-510*c* can enter sentinel mode and provide surveillance of the parking area 506. In some examples, one or more of the vehicles 510*a*-510*c* regularly captures sensor data from one or more sensors and transmits the captured sensor data to the central computer 502. In some examples, one or more of the vehicles 510*a*-510*c* regularly captures images from one or more sensors and transmits the captured images to the central computer 502. As described above with respect to FIGS. 2A-2C and 3, the central computer 502 can stitch together received sensor data, such as received images, to generate a field of view of the parking area.

As described above, each vehicle 510*a*-510*c* in the fleet of vehicles communicates with a routing coordinator. Thus, information gathered by various autonomous vehicles 510*a*-510*c* in the fleet can be saved and used to generate information for future routing determinations. For example, sensor data can be used to generate route determination parameters. In general, the information collected from the vehicles in the fleet can be used for route generation or to modify existing routes. In some examples, the routing coordinator collects and processes position data from multiple autonomous vehicles in real-time to avoid traffic and generate a fastest-time route for each autonomous vehicle. In some implementations, the routing coordinator uses collected position data to generate a best route for an autonomous vehicle in view of one or more traveling preferences and/or routing goals. In some examples, the routing coordinator uses collected position data corresponding to emergency events to generate a best route for an autonomous vehicle to avoid a potential emergency situation and associated unknowns. In some examples, the routing coordinator generates a route for a vehicle to the parking area 506. In some examples, a vehicle has one or more scheduled stops before embarking on its route to the parking area 506.

Example Autonomous Vehicle Management System

Figure 6:
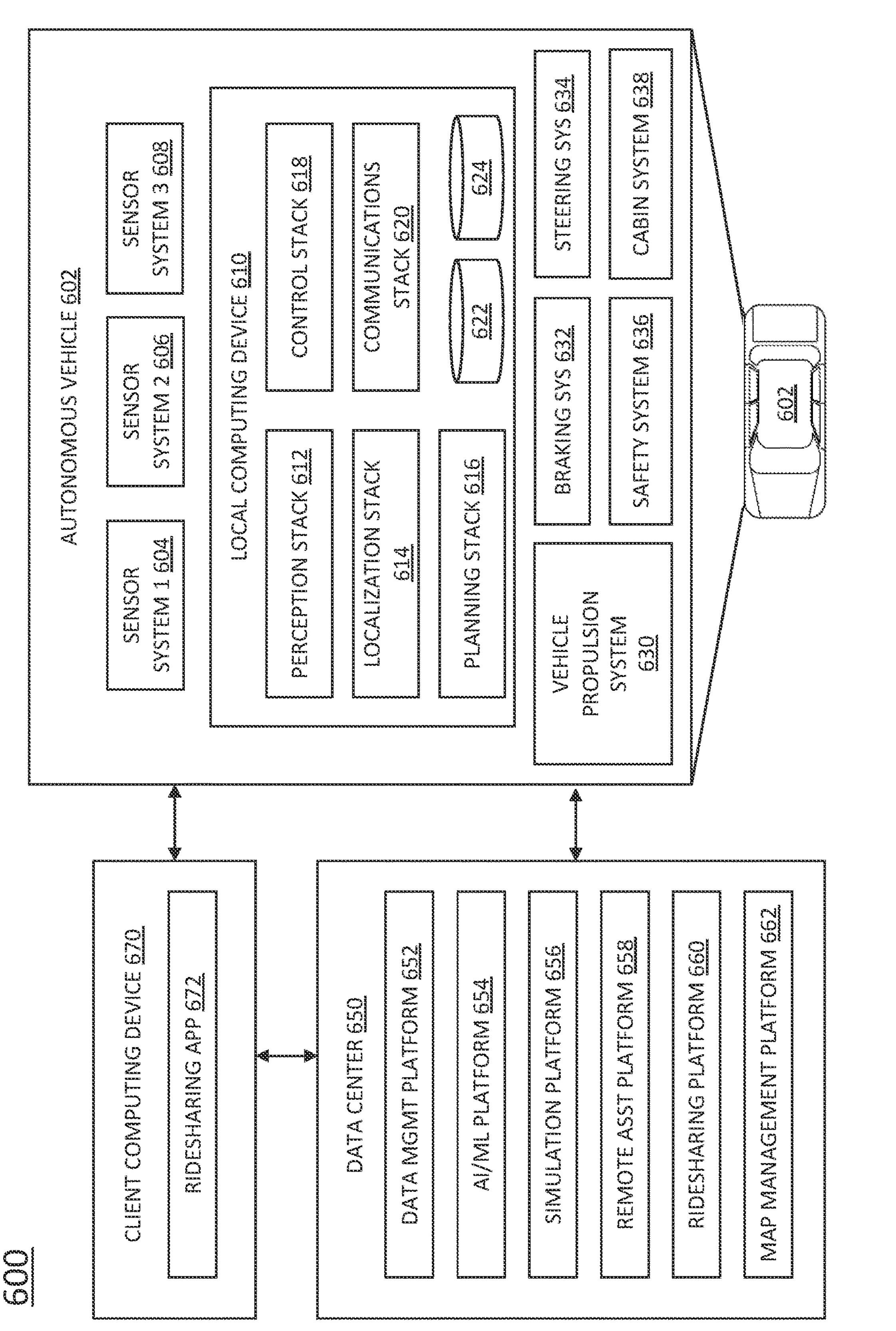
FIG. 6 illustrates an example system environment that can be used to facilitate autonomous vehicle (AV) dispatch and operations, according to some aspects of the disclosed technology.

Turning now to FIG. 6, this figure illustrates an example of an AV management system 600. One of ordinary skill in the art will understand that, for the AV management system 600 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 600 includes an AV 602, a data center 650, and a client computing device 670. The AV 602, the data center 650, and the client computing device 670 can communicate with one another over one or more networks (not shown), such as a public network (e.g., the Internet, an Infrastructure as a Service (IaaS) network, a Platform as a Service (PaaS) network, a Software as a Service (Saas) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 602 can navigate about roadways without a human driver based on sensor signals generated by multiple sensor systems 604, 606, and 608. The sensor systems 604-608 can include different types of sensors and can be arranged about the AV 602. For instance, the sensor systems 604-608 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 604 can be a camera system, the sensor system 606 can be a LIDAR system, and the sensor system 608 can be a RADAR system. Other embodiments may include any other number and type of sensors. In various examples, the sensor systems can be used to provide surveillance of the environment surrounding the vehicle. In some examples, the vehicle can enter a sentinel mode when parked, in which one or more vehicle sensors are activated to observe the surrounding environment.

AV 602 can also include several mechanical systems that can be used to maneuver or operate AV 602. For instance, the mechanical systems can include vehicle propulsion system 630, braking system 632, steering system 634, safety system 636, and cabin system 638, among other systems. Vehicle propulsion system 630 can include an electric motor, an internal combustion engine, or both. The braking system 632 can include an engine brake, a wheel braking system (e.g., a disc braking system that utilizes brake pads), hydraulics, actuators, and/or any other suitable componentry configured to assist in decelerating AV 602. The steering system 634 can include suitable componentry configured to control the direction of movement of the AV 602 during navigation. Safety system 636 can include lights and signal indicators, a parking brake, airbags, and so forth. The cabin system 638 can include cabin temperature control systems, in-cabin entertainment systems, and so forth. In some embodiments, the AV 602 may not include human driver actuators (e.g., steering wheel, handbrake, foot brake pedal, foot accelerator pedal, turn signal lever, window wipers, etc.) for controlling the AV 602. Instead, the cabin system 638 can include one or more client interfaces (e.g., Graphical User Interfaces (GUIs), Voice User Interfaces (VUIs), etc.) for controlling certain aspects of the mechanical systems 630-638.

AV 602 can additionally include a local computing device 610 that is in communication with the sensor systems 604-608, the mechanical systems 630-638, the data center 650, and the client computing device 670, among other systems. The local computing device 610 can include one or more processors and memory, including instructions that can be executed by the one or more processors. The instructions can make up one or more software stacks or components responsible for controlling the AV 602; communicating with the data center 650, the client computing device 670, and other systems; receiving inputs from riders, passengers, and other entities within the AV's environment; logging metrics collected by the sensor systems 604-608; and so forth. In this example, the local computing device 610 includes a perception stack 612, a mapping and localization stack 614, a planning stack 616, a control stack 618, a communications stack 620, a High Definition (HD) geospatial database 622, and an AV operational database 624, among other stacks and systems.

Perception stack 612 can enable the AV 602 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 604-608, the mapping and localization stack 614, the HD geospatial database 622, other components of the AV, and other data sources (e.g., the data center 650, the client computing device 670, third-party data sources, etc.). The perception stack 612 can detect and classify objects and determine their current and predicted locations, speeds, directions, and the like. In addition, the perception stack 612 can determine the free space around the AV 602 (e.g., to maintain a safe distance from other objects, change lanes, park the AV, etc.). The perception stack 612 can also identify environmental uncertainties, such as where to look for moving objects, flag areas that may be obscured or blocked from view, and so forth. The perception stack 612 can be used in sentinel mode to sense the vehicle environment and identify objects.

Mapping and localization stack 614 can determine the AV's position and orientation (pose) using different methods from multiple systems (e.g., GPS, IMUs, cameras, LIDAR, RADAR, ultrasonic sensors, the HD geospatial database 622, etc.). For example, in some embodiments, the AV 602 can compare sensor data captured in real-time by the sensor systems 604-608 to data in the HD geospatial database 622 to determine its precise (e.g., accurate to the order of a few centimeters or less) position and orientation. The AV 602 can focus its search based on sensor data from one or more first sensor systems (e.g., GPS) by matching sensor data from one or more second sensor systems (e.g., LIDAR). If the mapping and localization information from one system is unavailable, the AV 602 can use mapping and localization information from a redundant system and/or from remote data sources.

The planning stack 616 can determine how to maneuver or operate the AV 602 safely and efficiently in its environment. For example, the planning stack 616 can receive the location, speed, and direction of the AV 602, geospatial data, data regarding objects sharing the road with the AV 602 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 602 from one point to another. The planning stack 616 can determine multiple sets of one or more mechanical operations that the AV 602 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 616 can select from multiple backup plans to carry out. For example, while preparing to change lanes to turn right at an intersection, another vehicle may aggressively cut into the destination lane, making the lane change unsafe. The planning stack 616 could have already determined an alternative plan for such an event, and upon its occurrence, help to direct the AV 602 to go around the block instead of blocking a current lane while waiting for an opening to change lanes.

The control stack 618 can manage the operation of the vehicle propulsion system 630, the braking system 632, the steering system 634, the safety system 636, and the cabin system 638. The control stack 618 can receive sensor signals from the sensor systems 604-608 as well as communicate with other stacks or components of the local computing device 610 or a remote system (e.g., the data center 650) to effectuate operation of the AV 602. For example, the control stack 618 can implement the final path or actions from the multiple paths or actions provided by the planning stack 616. This can involve turning the routes and decisions from the planning stack 616 into commands for the actuators that control the AV's steering, throttle, brake, and drive unit.

The communication stack 620 can transmit and receive signals between the various stacks and other components of the AV 602 and between the AV 602, the data center 650, the client computing device 670, and other remote systems. The communication stack 620 can enable the local computing device 610 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 620 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 622 can store HD maps and related data of the streets upon which the AV 602 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/ permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 624 can store raw AV data generated by the sensor systems 604-608 and other components of the AV 602 and/or data received by the AV 602 from remote systems (e.g., the data center 650, the client computing device 670, etc.). In some embodiments, the raw AV data can include HD LIDAR point cloud data, image or video data, RADAR data, GPS data, and other sensor data that the data center 650 can use for creating or updating AV geospatial data as discussed further below with respect to FIG. 5 and elsewhere in the present disclosure.

The data center 650 can be a private cloud (e.g., an enterprise network, a co-location provider network, etc.), a public cloud (e.g., an Infrastructure as a Service (IaaS) network, a Platform as a Service (PaaS) network, a Software as a Service (Saas) network, or other Cloud Service Provider (CSP) network), a hybrid cloud, a multi-cloud, and so forth. The data center 650 can include one or more computing devices remote to the local computing device 610 for managing a fleet of AVs and AV-related services. For example, in addition to managing the AV 602, the data center 650 may also support a ridesharing service, a delivery service, a remote/roadside assistance service, street services (e.g., street mapping, street patrol, street cleaning, street metering, parking reservation, etc.), and the like.

The data center 650 can send and receive various signals to and from the AV 602 and the client computing device 670. These signals can include sensor data captured by the sensor systems 604-608, roadside assistance requests, software updates, ridesharing pick-up and drop-off instructions, and so forth. In this example, the data center 650 includes one or more of a data management platform 652, an Artificial Intelligence/Machine Learning (AI/ML) platform 654, a simulation platform 656, a remote assistance platform 658, a ridesharing platform 660, and a map management platform 662, among other systems.

Data management platform 652 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 650 can access data stored by the data management platform 652 to provide their respective services.

The AI/ML platform 654 can provide the infrastructure for training and evaluating machine learning algorithms for operating the AV 602, the simulation platform 656, the remote assistance platform 658, the ridesharing platform 660, the map management platform 662, and other platforms and systems. Using the AI/ML platform 654, data scientists can prepare data sets from the data management platform 652; select, design, and train machine learning models; evaluate, refine, and deploy the models; maintain, monitor, and retrain the models; and so on.

The simulation platform 656 can enable testing and validation of the algorithms, machine learning models, neural networks, and other development efforts for the AV 602, the remote assistance platform 658, the ridesharing platform 660, the map management platform 662, and other platforms and systems. The simulation platform 656 can replicate a variety of driving environments and/or reproduce real-world scenarios from data captured by the AV 602, including rendering geospatial information and road infrastructure (e.g., streets, lanes, crosswalks, traffic lights, stop signs, etc.) obtained from the map management platform 662; modeling the behavior of other vehicles, bicycles, pedestrians, and other dynamic elements; simulating inclement weather conditions, different traffic scenarios; and so on.

The remote assistance platform 658 can generate and transmit instructions regarding the operation of the AV 602. For example, in response to an output of the AI/ML platform 654 or other system of the data center 650, the remote assistance platform 658 can prepare instructions for one or more stacks or other components of the AV 602.

The ridesharing platform 660 can interact with a customer of a ridesharing service via a ridesharing application 672 executing on the client computing device 670. The client computing device 670 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 672. The client computing device 670 can be a customer's mobile computing device or a computing device integrated with the AV 602 (e.g., the local computing device 610). The ridesharing platform 660 can receive requests to be picked up or dropped off from the ridesharing application 672 and dispatch the AV 602 for the trip.

Map management platform 662 can provide a set of tools for the manipulation and management of geographic and spatial (geospatial) and related attribute data. The data management platform 652 can receive LIDAR point cloud data, image data (e.g., still image, video, etc.), RADAR data, GPS data, and other sensor data (e.g., raw data) from one or more AVs 602, Unmanned Aerial Vehicles (UAVs), satellites, third-party mapping services, and other sources of geospatially referenced data. The raw data can be processed, and map management platform 662 can render base representations (e.g., tiles (2D), bounding volumes (3D), etc.) of the AV geospatial data to enable users to view, query, label, edit, and otherwise interact with the data. Map management platform 662 can manage workflows and tasks for operating on the AV geospatial data. Map management platform 662 can control access to the AV geospatial data, including granting or limiting access to the AV geospatial data based on user-based, role-based, group-based, task-based, and other attribute-based access control mechanisms. Map management platform 662 can provide version control for the AV geospatial data, such as to track specific changes that (human or machine) map editors have made to the data and to revert changes when necessary. Map management platform 662 can administer release management of the AV geospatial data, including distributing suitable iterations of the data to different users, computing devices, AVs, and other consumers of HD maps. Map management platform 662 can provide analytics regarding the AV geospatial data and related data, such as to generate insights relating to the throughput and quality of mapping tasks.

In some embodiments, the map viewing services of map management platform 662 can be modularized and deployed as part of one or more of the platforms and systems of the data center 650. For example, the AI/ML platform 654 may incorporate the map viewing services for visualizing the effectiveness of various object detection or object classification models, the simulation platform 656 may incorporate the map viewing services for recreating and visualizing certain driving scenarios, the remote assistance platform 658 may incorporate the map viewing services for replaying traffic incidents to facilitate and coordinate aid, the ridesharing platform 660 may incorporate the map viewing services into the client application 672 to enable passengers to view the AV 602 in transit en route to a pick-up or drop-off location, and so on.

Figure 7:
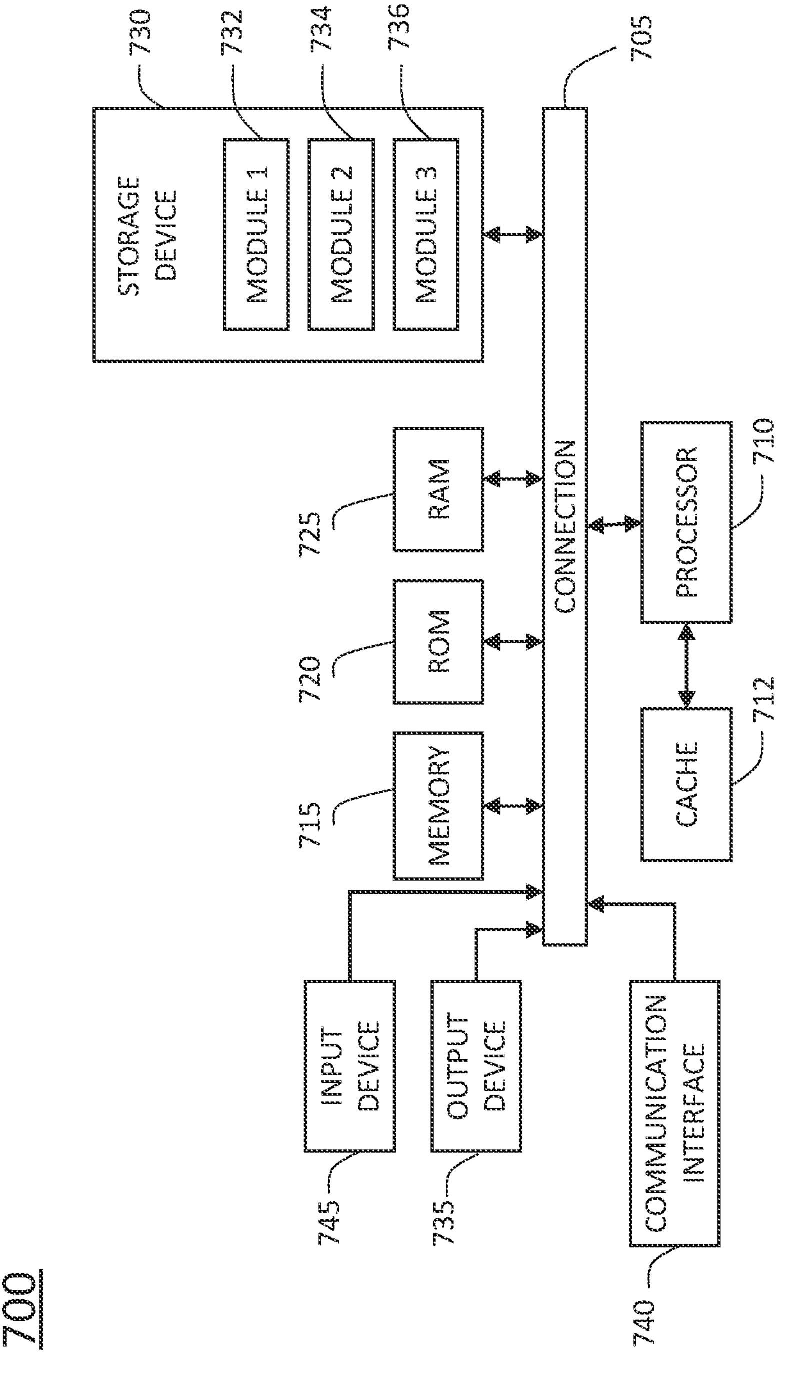
FIG. 7 illustrates an example processor-based system with which some aspects of the subject technology can be implemented.

FIG. 7 illustrates an example processor-based system with which some aspects of the subject technology can be implemented. For example, processor-based system 700 can be any computing device making up, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 700 includes at least one processing unit (Central Processing Unit (CPU) or processor) 710 and connection 705 that couples various system components including system memory 715, such as Read-Only Memory (ROM) 720 and Random-Access Memory (RAM) 725 to processor 710. Computing system 700 can include a cache of high-speed memory 712 connected directly with, in close proximity to, or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric. In some examples, the processor 710 is an image processor that can process images from vehicle image sensors. In some examples, the processor 710 can determine a sensor field of view. In some examples, the processor 710 can stitch together captured images from adjacent image sensors.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 730 can include software services, servers, services, etc., that when the code that defines such software is executed by the processor 710, it causes the system 700 to perform a function. In some embodiments, a hardware service that performs a particular function can include the software component stored in a computer-readable medium in connection with the necessary hardware components, such as processor 710, connection 705, output device 735, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in standalone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

SELECTED EXAMPLES

Example 1 provides a method comprising: dispatching a plurality of vehicles from a vehicle fleet to parking spaces in a parking area, wherein each of the plurality of vehicles includes a respective sensor suite having a plurality of sensors; receiving captured sensor data from each of the plurality of sensors from each respective vehicle of the plurality of vehicles and storing the received captured sensor data as a set of available captured sensor data; processing the set of available captured sensor data to identify a respective field of view of the parking area corresponding to each of the set of available captured sensor data; identifying a subset of the set of available captured sensor data that together provide a selected field of view of the parking area; identifying a subset of the plurality of vehicles corresponding to the identified subset of captured sensor data; determining that each vehicle in the subset of vehicles has sufficient charge to support sentinel mode operation; and transmitting a message to each vehicle in the subset of vehicles to activate the respective sensor suites and enter sentinel mode operation.

Example 2 provides a method, system, and/or vehicle according to any of the preceding and/or following examples, further comprising determining that a first vehicle in the subset of vehicles has insufficient charge to support sentinel mode operation, removing respective captured images captured by the first vehicle from the set of available captured images, and generating a revised set of available captured images.

Example 3 provides a method, system, and/or vehicle according to any of the preceding and/or following examples, further comprising identifying a first subset of images of the revised set of available captured images that together provide the selected field of view of the parking area.

Example 4 provides a method, system, and/or vehicle according to any of the preceding and/or following examples, further comprising identifying the respective image sensors in each respective vehicle of the subset of vehicles corresponding to the identified subset of captured images.

Example 5 provides a method, system, and/or vehicle according to any of the preceding and/or following examples, wherein transmitting the message includes transmitting the message to each respective vehicle of the subset of vehicles to activate the respective image sensors.

Example 6 provides a method, system, and/or vehicle according to any of the preceding and/or following examples, further comprising determining the selected field of view, including identifying high priority portions of the parking area and low priority portions of the parking area.

Example 7 provides a method, system, and/or vehicle according to any of the preceding and/or following examples, wherein high priority areas include highly trafficked areas.

Example 8 provides a system for automated fleet parking area surveillance, comprising a plurality of vehicles in communication with a dispatch service, each vehicle having a respective sensor suite including a plurality of image sensors, wherein each of the plurality of image sensors is configured to capture an image upon vehicle parking in a respective parking space in a parking area, a dispatch service in communication with each of the plurality of vehicles and configured to dispatch respective vehicles to the parking area, a central computer in communication with the dispatch service and with each of the plurality of vehicles, the central computer configured to: receive captured images from each of the plurality of image sensors from each respective vehicle of the plurality of vehicles; store the received captured images as a set of available captured images;

process the set of available captured images to identify a respective field of view of the parking area corresponding to each of the set of available captured images; identify a subset of the set of available captured images that together provide a selected field of view of the parking area; and identify a subset of the plurality of vehicles corresponding to the identified subset of the available captured images.

Example 9 provides a method, system, and/or vehicle according to any of the preceding and/or following examples, wherein the central computer is further configured to determine that each vehicle in the subset of vehicles has sufficient charge to support sentinel mode operation.

Example 10 provides a method, system, and/or vehicle according to any of the preceding and/or following examples, wherein the central computer is further configured to transmit a message to each vehicle in the subset of vehicles to activate the respective sensor suites and enter sentinel mode operation.

Example 11 provides a method, system, and/or vehicle according to any of the preceding and/or following examples wherein the central computer is further configured to: determine that a first vehicle in the subset of vehicles has insufficient charge to support sentinel mode operation, remove respective captured images captured by the first vehicle image sensors from the set of available captured images, and generate a revised set of available captured images.

Example 12 provides a method, system, and/or vehicle according to any of the preceding and/or following examples, wherein the subset of the set of available captured images is a first subset of images, and wherein the central computer is further configured to identify a second subset of images from the revised set of available captured images that together provide the selected field of view of the parking area.

Example 13 provides a method, system, and/or vehicle according to any of the preceding and/or following examples, wherein the central computer is further configured to: identify respective image sensors corresponding to the identified subset of captured images.

Example 14 provides a method, system, and/or vehicle according to any of the preceding and/or following examples, wherein the central computer is further configured to transmit a message to each vehicle in the subset of vehicles to activate the respective identified image sensors.

Example 15 provides a method, system, and/or vehicle according to any of the preceding and/or following examples, wherein the central computer is further configured to identify respective image sensors corresponding to the identified subset of captured images.

Example 16 provides a method for automated vehicle fleet surveillance comprising: receiving a high definition map of a parking area including a plurality of parking spaces; receiving vehicle data from each of a plurality of fleet vehicles parked in respective parking spaces of the plurality of parking spaces, each fleet vehicle having a set of sensors, each respective sensor having a respective sensor field of view; determining a surveillance coverage area of the parking area based on the high definition map and the vehicle data; identifying an overlap in the respective sensor fields of view of a subset of the sets of sensors; and selectively deactivating at least one sensor from the set of sensors based on the overlap.

Example 17 provides a method, system, and/or vehicle according to any of the preceding and/or following examples, wherein the vehicle data includes a plurality of captured images from the respective sets of sensors for each respective fleet vehicle.

Example 18 provides a method, system, and/or vehicle according to any of the preceding and/or following examples, wherein each fleet vehicle of the plurality of fleet vehicles has a vehicle field of view and further comprising identifying an overlap in respective vehicle fields of view.

Example 19 provides a method, system, and/or vehicle according to any of the preceding and/or following examples, further comprising determining a respective state of charge for each fleet vehicle of the plurality of fleet vehicles.

Example 20 provides a method, system, and/or vehicle according to any of the preceding and/or following examples, further comprising identifying a first parking space of the plurality of parking spaces for which a respective first vehicle field of view overlaps with other respective vehicle fields of view, identifying a first vehicle with a low state of charge, parking the first vehicle in the first parking space, and deactivating the respective set of sensor for the first vehicle.

Example 21 provides a method for automated vehicle fleet surveillance comprising: determining a high definition map of a parking area including a plurality of parking spaces; determining, for each parking space of the plurality of parking spaces, a parking space field of view for each of a plurality of sensors on a fleet vehicle model; identifying, based on the parking space field of view determinations, a first plurality of parking spaces from which a first subset of vehicles together provide a first parking area field of view, wherein respective vehicles of the first subset of vehicles are the fleet vehicle model; identifying, for each of the first plurality of parking spaces, a first subset of sensors on the fleet vehicle model that together provide the first parking area field of view.

Example 22 provides a method, system, and/or vehicle according to any of the preceding and/or following examples, wherein the selected field of view is a surveillance coverage area of the parking area, and further comprising determining the surveillance coverage area based on a high definition map and the set of available captured images.

Example 23 provides a method comprising: dispatching a plurality of vehicles from a vehicle fleet to parking spaces in a parking area, wherein each of the plurality of vehicles includes a respective sensor suite having a plurality of image sensors; receiving captured images from each of the plurality of image sensors from each respective vehicle of the plurality of vehicles and storing the received captured images as a set of available captured images; processing the set of available captured images to identify a respective field of view of the parking area corresponding to each of the set of available captured images; identifying a subset of the set of available captured images that together provide a selected field of view of the parking area; identifying a subset of the plurality of vehicles corresponding to the identified subset of captured images; determining that each vehicle in the subset of vehicles has sufficient charge to support sentinel mode operation; and transmitting a message to each vehicle in the subset of vehicles to activate the respective sensor suites and enter sentinel mode operation.

Example 24 includes a vehicle comprising means for performing the method of any of the examples 1-23.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A computer implemented method for vehicle fleet surveillance comprising:

dispatching, by a central computer, a plurality of vehicles from a vehicle fleet to parking spaces in a parking area, wherein each of the plurality of vehicles includes a respective sensor suite having a plurality of image sensors;

receiving captured images from each of the plurality of image sensors from each respective vehicle of the plurality of vehicles;

storing the received captured images as a set of available captured images;

processing the set of available captured images to identify a respective field of view of the parking area corresponding to each of the set of available captured images;

identifying a subset of the set of available captured images that together provide a selected field of view of the parking area;

identifying a subset of the plurality of vehicles corresponding to the identified subset of captured images;

determining that each vehicle in the subset of vehicles has sufficient charge to support sentinel mode operation;

transmitting a message to each vehicle in the subset of vehicles to activate the respective sensor suites and enter the sentinel mode operation;

identifying, using a high-definition map of the parking area, a first parking space having a field of view that is substantially redundant with fields of view from other parking spaces;

determining, for a first vehicle of the plurality of vehicles, that a predicted future state of charge fails to satisfy a predetermined threshold; and based on identifying the first parking space having the field of view that is substantially redundant with fields of view from other parking spaces and determining that the predicted future state of charge fails to satisfy the predetermined threshold:

dispatching the first vehicle to the first parking space;

selecting the respective sensor suite of the first vehicle for deactivation based on the first vehicle having a lower state of charge than a second vehicle having a sensor with an overlapping field of view; and deactivating the respective sensor suite of the first vehicle when the first vehicle arrives at the first parking space.

2. The computer implemented method of claim 1, further comprising based on determining that the predicted future state of charge fails to satisfy the predetermined threshold:

removing respective captured images captured by the first vehicle from the set of available captured images; and generating a revised set of available captured images.

3. The computer implemented method of claim 2, further comprising identifying a first subset of images of the revised set of available captured images that together provide the selected field of view of the parking area.

4. The computer implemented method of claim 1, further comprising identifying respective image sensors in each respective vehicle of the subset of vehicles corresponding to the identified subset of captured images.

5. The computer implemented method of claim 4, wherein transmitting the message includes transmitting the message to each respective vehicle of the subset of vehicles to activate the respective image sensors.

6. The computer implemented method of claim 1, further comprising determining the selected field of view, including identifying high priority portions of the parking area and low priority portions of the parking area, wherein the high priority portions include highly trafficked areas.

7. The computer implemented method of claim 1, wherein the selected field of view is a surveillance coverage area of the parking area.

8. A system for fleet parking area surveillance, comprising:

a plurality of vehicles each having a respective sensor suite including a plurality of image sensors, wherein each of the plurality of image sensors is configured to capture an image upon vehicle parking in a respective parking space in a parking area;

a dispatch service in communication with each of the plurality of vehicles and configured to dispatch respective vehicles to the parking area;

a central computer in communication with the dispatch service and with each of the plurality of vehicles, the central computer configured to:

receive captured images from each of the plurality of image sensors from each respective vehicle of the plurality of vehicles;

store the received captured images as a set of available captured images;

process the set of available captured images to identify a respective field of view of the parking area corresponding to each of the set of available captured images;

identify a subset of the set of available captured images that together provide a selected field of view of the parking area;

identify a subset of the plurality of vehicles corresponding to the identified subset of the available captured images;

determine that each vehicle in the subset of vehicles has sufficient charge to support sentinel mode operation;

transmit a message to each vehicle in the subset of vehicles to activate the respective sensor suites and enter the sentinel mode operation;

identify, using a high-definition map of the parking area, a first parking space having a field of view that is substantially redundant with fields of view from other parking spaces;

determine, for a first vehicle of the plurality of vehicles, that a predicted future state of charge fails to satisfy a predetermined threshold; and based on identifying the first parking space having the field of view that is substantially redundant with fields of view from other parking spaces and determining that the predicted future state of charge fails to satisfy the predetermined threshold:

dispatch the first vehicle to the first parking space;

select the respective sensor suite of the first vehicle for deactivation based on the first vehicle having a lower state of charge than a second vehicle having a sensor with an overlapping field of view; and deactivate the respective sensor suite of the first vehicle when the first vehicle arrives at the first parking space.

9. The system of claim 8, wherein the first vehicle comprises an autonomous vehicle.

10. The system of claim 9, wherein the central computer is further configured to identify a first subset of images of a revised set of available captured images that together provide the selected field of view of the parking area.

11. The system of claim 9, wherein the central computer is further configured to:

remove respective captured images captured by the first vehicle from the set of available captured images; and generate a revised set of available captured images.

12. The system of claim 11, wherein the subset of the set of available captured images is a first subset of images, and wherein the central computer is further configured to identify a second subset of images from the revised set of available captured images that together provide the selected field of view of the parking area.

13. The system of claim 8, wherein the plurality of image sensors comprise a plurality of camera sensors.

14. The system of claim 13, wherein the central computer is further configured to transmit a deactivation message to the first vehicle to deactivate the respective sensor suite of the first vehicle.

15. The system of claim 8, wherein the central computer is further configured to identify respective image sensors corresponding to the identified subset of captured images.

16. A method for vehicle fleet surveillance comprising:

receiving a high definition map of a parking area including a plurality of parking spaces;

receiving vehicle data from each of a plurality of fleet vehicles parked in respective parking spaces of the plurality of parking spaces, each fleet vehicle includes a respective sensor suite having a plurality of image sensors, each image sensor having a respective sensor field of view;

determining that each fleet vehicle has sufficient charge to support sentinel mode operation;

transmitting a message to each fleet vehicle to activate the respective sensor suites and enter the sentinel mode operation;

identifying, using a high-definition map of the parking area, a first parking space having a field of view that is substantially redundant with fields of view from other parking spaces;

determining, for a first vehicle of the plurality of fleet vehicles, that a predicted future state of charge fails to satisfy a predetermined threshold; and based on identifying the first parking space having the field of view that is substantially redundant with fields of view from other parking spaces and determining that the predicted future state of charge fails to satisfy the predetermined threshold:

dispatching the first vehicle to the first parking space;

selecting the respective sensor suite of the first vehicle for deactivation based on the first vehicle having a lower state of charge than a second vehicle having a sensor with an overlapping field of view; and deactivating the respective sensor suite of the first vehicle when the first vehicle arrives at the first parking space.

17. The method of claim 16, wherein the vehicle data includes a plurality of captured images from the plurality of image sensors for each respective fleet vehicle.

18. The method of claim 17, wherein each fleet vehicle of the plurality of fleet vehicles has a vehicle field of view and further comprising identifying an overlap in respective vehicle fields of view.

19. The method of claim 18, further comprising determining a respective state of charge for each fleet vehicle of the plurality of fleet vehicles.

20. The method of claim 19, further comprising, based on determining that the predicted future state of charge fails to satisfy the predetermined threshold:

removing respective captured images captured by the first vehicle from a set of available captured images; and generating a revised set of available captured images.

* * * * *